Figure 1:
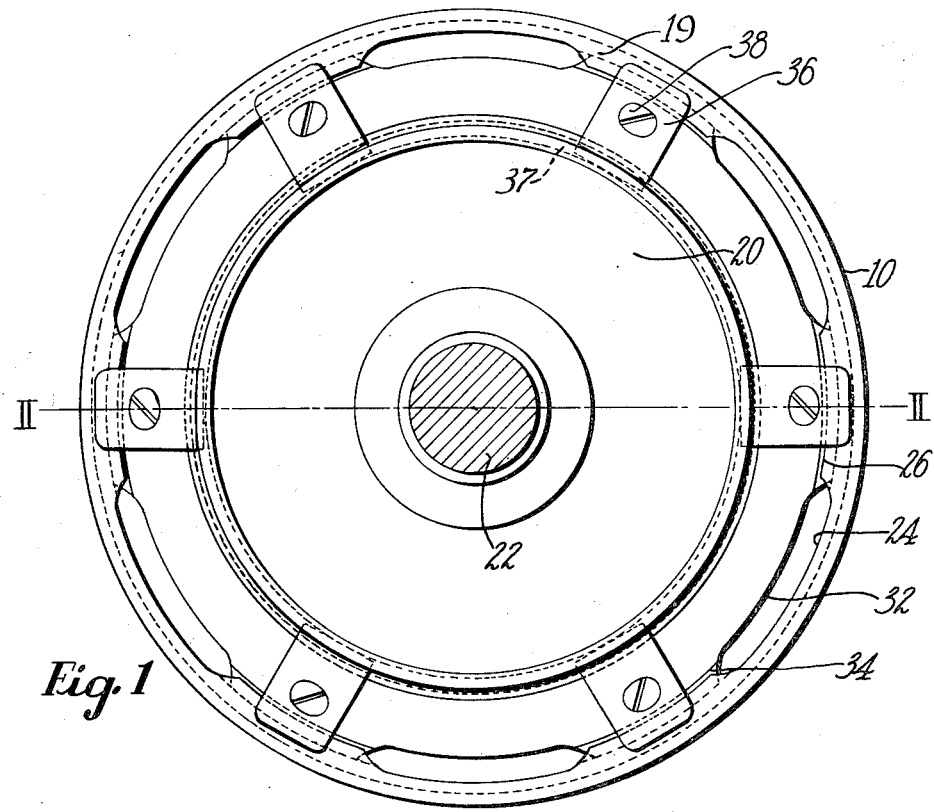

Feb. 26, 1957  A. MÜHLBACH  2,782,854
ROTARY KNIVES FOR TRIMMING MACHINES
Filed July 2, 1954

Inventor
Anton Mühlbach
By his Attorney

United States Patent Office 2,782,854
Patented Feb. 26, 1957

2,782,854

ROTARY KNIVES FOR TRIMMING MACHINES

Anton Mühlbach, Frankfurt am Main Nied, Germany, assignor, by mesne assignments, to United Shoe Machinery Corporation, Boston, Mass., a corporation of New Jersey Application July 2, 1954, Serial No. 440,903

Claims priority, application Germany July 22, 1953

4 Claims. (Cl. 164—70)

This invention relates to trimming knives, and particularly to rotary knives having a cylindrical or tubular blade portion provided with a sharp, concentrically operating, cutting edge that is especially suitable for trimming the margins of extremely thin or flexible work materials. More particularly, the invention relates to an improved construction wherein the cylindrical blade portion of the knife is detachably secured to a flanged hub portion mounted on the end of a power driven shaft.

Among the objects of the present invention is the provision of an inexpensive rotary knife the cutting edge of which, even after prolonged sharpening, may be maintained so that all points along the edge will be concentric with their axis of rotation and will be disposed in a single given radial plane.

A further object of the invention is the provision of a two-part knife so constructed that, after the blade portion has become materially reduced in stock due to repeated sharpening, it may be detached readily from the driving hub portion and may be replaced quickly by a new blade which, in turn, may be secured to the old hub by a clamping arrangement which quickly and automatically locates the blade portion in the machine so that the cutting edge at all times is accurately maintained as above described.

In order to trim thin work materials with a rotary knife and to produce a uniformly finished margin, it is essential that the knife have a very sharp cutting edge and that the entire edge traverse the work at a single point along the same circular path as the work is fed toward the knife. That is to say, the cylindrical portion of the knife upon which the cutting edge is ground must be a true cylinder and must be rotatably mounted so that its geometric axis coincides precisely with its axis of rotation. If otherwise formed or mounted, all points along the cutting edge will not traverse the same path and, therefore, when the continuously rotated cutting edge is engaged with the marginal material to be trimmed, the eccentricity of the knife edge will either cause thin material to be deflected out of the desired path of feed or, if the material is thick enough to enable a prescribed line of work feed to be maintained, the cut thereby produced will be wavy or ragged. The tendency of a rotary knife to produce a ragged or shredded trimmed margin is noticeable to a marked degree when trimming off the peripheral flash portions of a molded rubber article, such as a shoe sole. Since the very thin rubber flash material required to be trimmed away frequently extends from the molded rubber sole in a plane intermediate or between the upper and lower main surface planes of the sole, it becomes impossible to support the flash adequately as by contact with a work feed table. In this instance, the slightest degree of eccentricity in the rotation of the cutting edge will cause the very flexible flash portion to be deflected, thus causing the desired line of trim to be displaced beyond the reach of the cutting edge.

Many efforts, involving different approaches, have heretofore been made toward providing an inexpensive cylindrical trimming knife having a cutting edge which will, after sharpening, continue to operate with a high degree of concentricity. The result of one such effort is disclosed in United States Letters Patent No. 1,076,934, issued October 28, 1913, to A. M. Alexander, wherein the knife blade portion is formed from a thin flat band of steel bent into the shape of a cylinder and so maintained by clamping a side wall of the blade against the cylindrical wall of a supporting sleeve. While this arrangement provided an inexpensive blade portion which could be replaced readily and cheaply, the construction was unsatisfactory for the reason that the butted ends of the steel band produced a discontinuous cutting edge that lacked rigidity and allowed the edge adjacent the butted portions to be deflected out of circular alinement when under the stress of cutting or resharpening operations. It is generally known that rotary knives are commonly made in one piece by either drawing or drop-forging operations. To produce an integral drawn cup-shaped knife requires several extremely complicated drawing tools. The high cost of such tools is warranted only when knives must be manufactured in very large numbers. In addition, the drawn members must be finished by laborious grinding operations to assure that the knife edges will operate concentrically. The difficulties encountered in these finishing operations stem from the fact that the grinding of the flange or base portion of such a knife requires a separate operation from the grinding of the blade or shell portion, so that, in addition to the requirement for separate finishing tools, inaccuracies are unavoidable in view of the necessity for relocating the member for each finishing operation. A further disadvantage of the integral drawing approach is that the drawing operations produce a nonuniform compacting of the steel, causing tensions to be set up which become apparent only after the subsequent heat treatment, therefore the number of rejected knives is relatively high, thus increasing the unit price per knife. Another method, which has met with little success for producing one-piece knives having a high degree of concentricity, consists in drop-forging the knife blank, and then finishing the knife by turning or grinding operations comparable in difficulty to the finishing steps above mentioned. The drop-forged steel has also been found to contain nonuniform stresses and degrees of compacting which, as was the case with the drawn blank, result in a large number of rejects wherever precise concentricity is a controlling factor. Even where forged or drawn knives have been finished to a true geometrical form, it frequently happens that internal soft spots in the steel of the blade portion do not become apparent until after the knife edge has been placed in use, whereupon the edge will evidence an unevenness due to its more rapid wear in the softer regions.

To overcome the foregoing manufacturing difficulties and in accordance with the various features of the invention, there is provided a two-part rotary trimming knife having a cylindrical blade member which is releaseably engageable with a driven hub member by means of a complementary set of flanges formed on each member and separated by circumferential spaces. The hub and the blade may be locked together by a plurality of clamping members when the flanges are in overlapping axial engagement and may be separated from each other by rotating the flanges on one member into alinement with the spaces on the other and then moving the members axially apart. Each of the clamping members comprises a flexible leaf spring associated with one set of complementary flanges. One end of the spring contacts a conical exterior surface formed on the blade and the other end of the spring contacts a substantially alined conical exterior surface on the hub. A clamping screw is located intermediate the ends of the spring and has a shank threaded in the hub member and a conical head extending through the spring and engageable with the hub when the screw is in a fully advanced clamping position. The screw is adjustable from a first position wherein the ends of the spring are pressed against the ends of the conical surface to urge the alined flanges together with sufficient force to prevent relative rotation of the members to a second position wherein the force is released and the members may be rotated to positions wherein they can be axially separated.

The above and other features of the invention, including various and novel details of construction and combination of parts, will now be more particularly described with reference to the accompanying drawings and pointed out in the claims.

Figure 2:
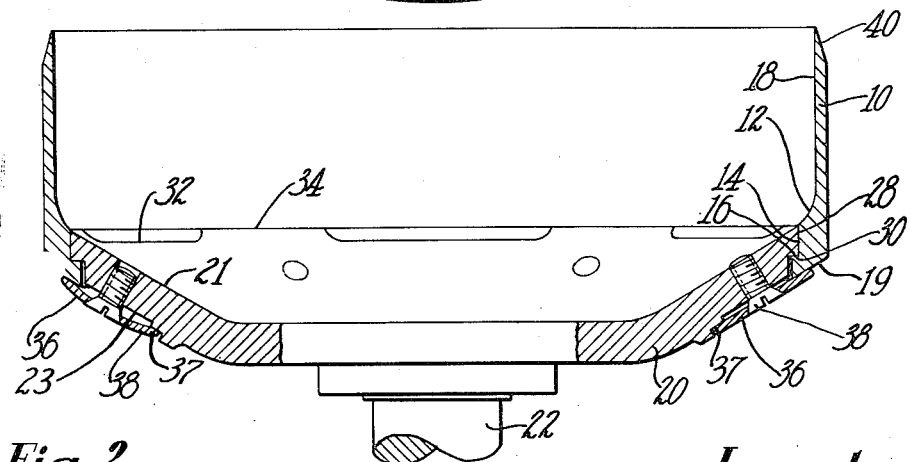

In the drawings,

Fig. 1 is a rear end elevation of the trimming knife showing the manner in which the blade portion is detachably secured to the driving hub portion; and Fig. 2 is a sectional view, taken along the line II—II of Fig. 1, showing further constructional details of the knife.

Referring to the drawings, the cylindrical blade portion 10 is preferably formed from a short section of steel pipe or tubing, lengths of which are relatively inexpensive and may be commercially obtained having a high degree of both geometric symmetry and uniformity in structural density or hardness. The inner wall of the tubular section is ground to the configuration illustrated in Fig. 2, wherein the thickened end portion 12 is provided with shouldered seats 14 and 16. The finished inner surfaces of the blade, including the wall 18 and both shoulders 14 and 16, may be produced in a single grinding operation thereby not only guaranteeing accuracy as to concentricity of form, but also providing economy and speed of production. The thickened end portion 12 is then provided with a conical exterior edge surface 19 and a series of axially extending wide recesses 24, spaced uniformly around the entire inner circumference, thereby forming a number of projections or lands 26 extending toward the interior of the knife.

The flanged hub portion 20, which preferably is integral with the power driven shaft 22, is frusto-conical in cross section, having an inner conical wall 21 and an outer conical wall 23. The hub is also provided, by a single grinding operation, with a set of shouldered seats 28 and 30 formed to complement the set of shoulders 14, 16 on the blade portion of the knife. Formed on the outer wall 23 of the hub is a conical surface 37 in substantial alinement with the conical surface 19 on the knife. The shouldered portion of the hub is also provided with a series of recesses 32, thereby also forming spaced apart projections 34 which, contrary to the blade projections 26, extend outwardly. The shoulder faces 16 of the blade portion 10 uniformly contact the seat faces 30 of the flanged hub portion 20 when the two portions are assembled. In assembling the knife, the blade portion 10 is brought into engagement with the portion 20 from the front side of the machine. In so doing, the projections or lands 26 of the blade are caused to move along the cooperating recesses 32 cut in the hub, while the projections 34 on the hub are disposed along the opposite recesses 24 cut in the blade. The blade portion 10 is slid backwards into the machine until each shoulder 16 is in a position to be seated against a corresponding shoulder 30 on the hub portion. Then, by rotating the blade portion slightly in either direction, the seat faces 14 and 28, as well as the seat faces 16 and 30, are brought into mutual nested engagement, thus concentrically locating the blade portion with respect to the hub portion.

A number of uniformly spaced resilient clamping members, each in the form of a leaf spring 36 normally having a slight arcuate bend (as illustrated at the left of Fig. 2), are drawn tightly down upon the conical rear edge 19 of the finished blade and alined conical surface 37 on the hub by screws 38 each threaded into the outer wall 23 of the hub. It is to be noted that the clamping arrangement is such that the unsupported and resilient midportion of each spring 36 is held by a screw under uniform tension to prevent the blade portion of the knife from becoming distorted. The equal tensioning of each clamping member is assured by causing the conical head of each screw 38 which fits within a countersunk hole intermediate the ends of the spring to bottom against the rim of the tapped hole into which the screw is inserted, thus providing a positive stop to the tensioning action of each screw. In this manner all clamping members may be uniformly tensioned. As is customary, the cutting edge 40 of the blade portion is ground to a sharp edge after the knife is assembled in the trimming machine. Since all portions of the knife are concentrically related to the turning axis of the shaft 22, the finished trimming knife edge which is provided and maintained by a grinding wheel associated with the machine, will of necessity have all points along its edge disposed in the same radial plane, thereby assuring the high quality trimming which constitutes the primary objective of the present invention.

The above described construction, in addition to producing a concentrically operating knife, provides an inexpensive blade which may be quickly removed and replaced with another blade by merely loosening the screws 38 sufficiently to release the tension of the clamping springs 36 to thereby permit the blade to be rotated and then removed by sliding it forward in the machine. A further advantageous feature of this invention is that the entire inner surface of the knife is smooth and presents no projections or corners upon which pieces of the trimmed off marginal material may become caught.

Having thus described my invention, what I claim as new and desire to secure by Letters Patent of the United States is:

1. In a two-part rotary trimming knife having a cylindrical blade member engageable with a driven hub member by complementary sets of flanges separated on each member by circumferential spaces, a plurality of clamping means operable to lock the members together when the flanges are in overlapping axial engagement and releasable to permit the members to be moved axially of each other by rotating the flanges on one member into alinement with the recesses on the other, each clamping means comprising a flexible leaf spring associated with one set of complementary flanges, the spring having one end contacting a conical exterior surface on the blade member and the other end contacting a substantially alined conical exterior surface on the hub member, and a clamping screw located intermediate the ends of the spring having a shank threaded in the hub member and a conical head extending through said spring and engageable with the hub member when the screw is in fully advanced clamping position.

2. In a two-part rotary trimming knife having a cylindrical blade member engageable with a driven hub member by complementary sets of flanges separated on each member by equal circumferential spaces, a plurality of clamping means operable to lock the members together when their flanges are in overlapping axial engagement and releasable to permit the members to be rotated relative to each other to aline the flanges on one member with the spaces on the other, whereby the members may be moved axially apart, each clamping means comprising a flexible leaf spring associated with one set of complementary flanges, the spring having one end contacting a conical exterior surface formed on the blade member and the other end contacting a substantially alined conical exterior surface formed on the hub member, and a clamping screw located intermediate the ends of the spring and threaded in the hub member, the screw being adjustable from a first position wherein the ends of the spring are pressed against the conical surfaces to urge the alined flanges together with sufficient force to prevent relative rotation of the members to a second position wherein the force is released and the members may be rotated to positions wherein they can be axially separated.

3. In a two-part rotary trimming knife having a cylindrical blade member engageable with a driven hub member by complementary sets of flanges separated on each member by equal circumferential spaces, a plurality of clamping means operable to lock the members together when their flanges are in overlapping axial engagement and releasable to permit the members to be rotated relative to each other to aline the flanges on one member with the spaces on the other, whereby the members may be moved axially apart, each clamping means comprising a flexible leaf spring associated with one set of complementary flanges, the spring having one end contacting a conical exterior surface formed on the blade member and the other end contacting a substantially alined conical exterior surface formed on the hub member, and a clamping screw located intermediate the ends of the spring having a shank threaded in the hub member and a conical head extending through said spring, the screw being adjustable from a first position wherein its conical head is in engagement with the hub member and the ends of the spring are pressed against said conical surfaces to urge the alined flanges together with sufficient force to prevent relative rotation of the members to a second position wherein the force is released and the members may be rotated to positions wherein they can be axially separated.

4. A two-part rotary trimming knife comprising a demountable hollow cylindrical blade having a circular cutting edge on one end and a conical exterior surface on the other end, a plurality of inwardly extending concentric shoulders symmetrically spaced apart on the inner wall of the blade opposite the conical exterior surface, a hollow frusto-conical hub mounted on the end of a driven shaft, an equal number of outwardly extending circumferentially spaced-apart shoulders formed on the hub as the direct complements to the shoulders on the blade, said hub having a conical exterior surface in substantial alinement with and spaced from the conical exterior surface on the blade, and a plurality of clamping members to urge the shoulders on the blade and hub axially into engagement, each clamping member comprising a flexible leaf spring associated with one set of complementary shoulders and having one end contacting the conical exterior surface on the blade and the other end contacting the conical exterior surface on the hub, a force-applying screw located intermediate the ends of said spring having a shank threaded in the hub and a conical head extending through the spring and engageable with the hub when the screw is in fully advanced clamping position.

References Cited in the file of this patent

UNITED STATES PATENTS

| 1,076,934 | Alexander | Oct. 28, 1913 |

FOREIGN PATENTS

| 310,796 | Germany | June 3, 1919 |
| 353,658 | Germany | May 22, 1922 |
| 359,619 | Germany | Sept. 25, 1922 |
| 826,383 | France | Mar. 30, 1938 |